United States Patent [19]

Smith et al.

[11] Patent Number: 5,393,017
[45] Date of Patent: Feb. 28, 1995

[54] TECHNIQUE FOR DISPENSING EARTH SATELLITES INTO MULTI-PLANAR ORBITS

[75] Inventors: Stanford S. Smith; Gerasimos M. Marinos, both of Boulder Creek; Emanuel V. Dimicelli, Palo Alto, all of Calif.

[73] Assignee: Lockheed Missiles & Space Company, Inc., Sunnyvale, Calif.

[21] Appl. No.: 8,036

[22] Filed: Jan. 25, 1993

[51] Int. Cl.$^6$ ............................................. B64G 1/00
[52] U.S. Cl. .................................. 244/158 R; 244/172
[58] Field of Search ........................... 244/158 R, 172

[56] References Cited

U.S. PATENT DOCUMENTS

| | | | |
|---|---|---|---|
| 3,652,042 | 3/1972 | Welther | 244/158 R |
| 5,178,347 | 1/1993 | Johnson et al. | 244/158 R |
| 5,199,672 | 4/1993 | King et al. | 244/158 R |

Primary Examiner—Michael S. Huppert
Assistant Examiner—Anne E. Bidwell
Attorney, Agent, or Firm—Oblon, Spivak, McClelland, Maier & Neustadt

[57] ABSTRACT

A launch vehicle (e.g., a rocket) carrying a payload consisting of:

1) a first set of one or more satellites for delivery to a designated first orbit in a first orbital plane, and
2) a second set of one or more other satellites for delivery to a designated second orbit in a second orbital plane, is launched from earth in a conventional manner to an orbit in the first orbital plane where the satellites of the first set are released into the designated first orbit in the first orbital plane. Then, after the first set of satellites has been released, a first acceleration is imparted to the launch vehicle to change the inclination and the longitude of the ascending node of the launch vehicle by an appropriate amount so as to cause a nodal drift of the launch vehicle from the first orbital plane to the second orbital plane over a specified time interval. When the launch vehicle reaches the second orbital plane, a second acceleration is then imparted to the launch vehicle to counteract the change in inclination produced by the first acceleration—thereby causing the launch vehicle to be restored to the inclination that it had prior to the application of the first acceleration. The second acceleration stops the nodal drift of the launch vehicle, whereupon the launch vehicle assumes a relatively permanent orbit in the second orbital plane. The satellites of the second set are then released into the designated second orbit in the second orbital plane.

8 Claims, 4 Drawing Sheets

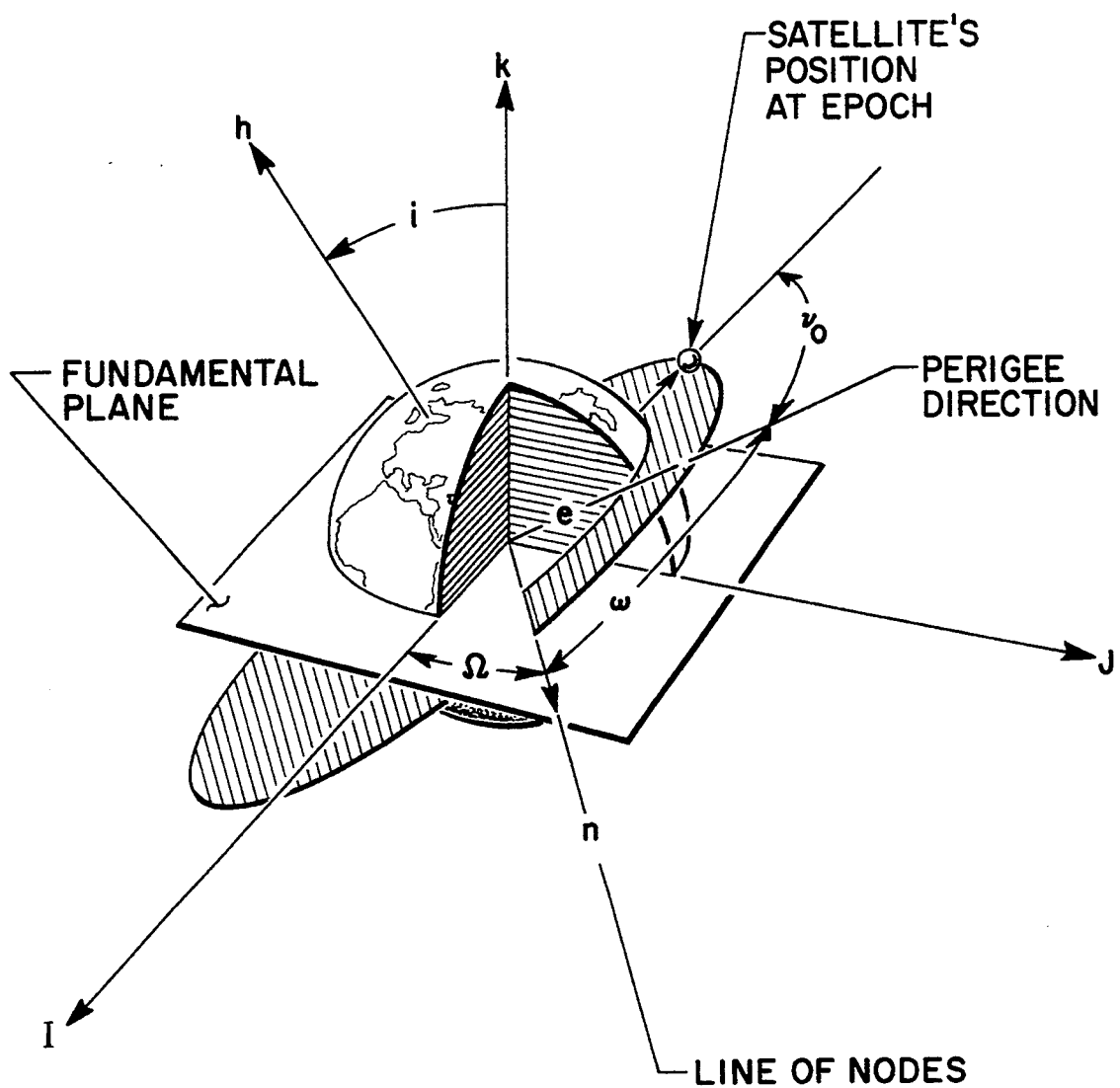
FIG_1
PRIOR ART

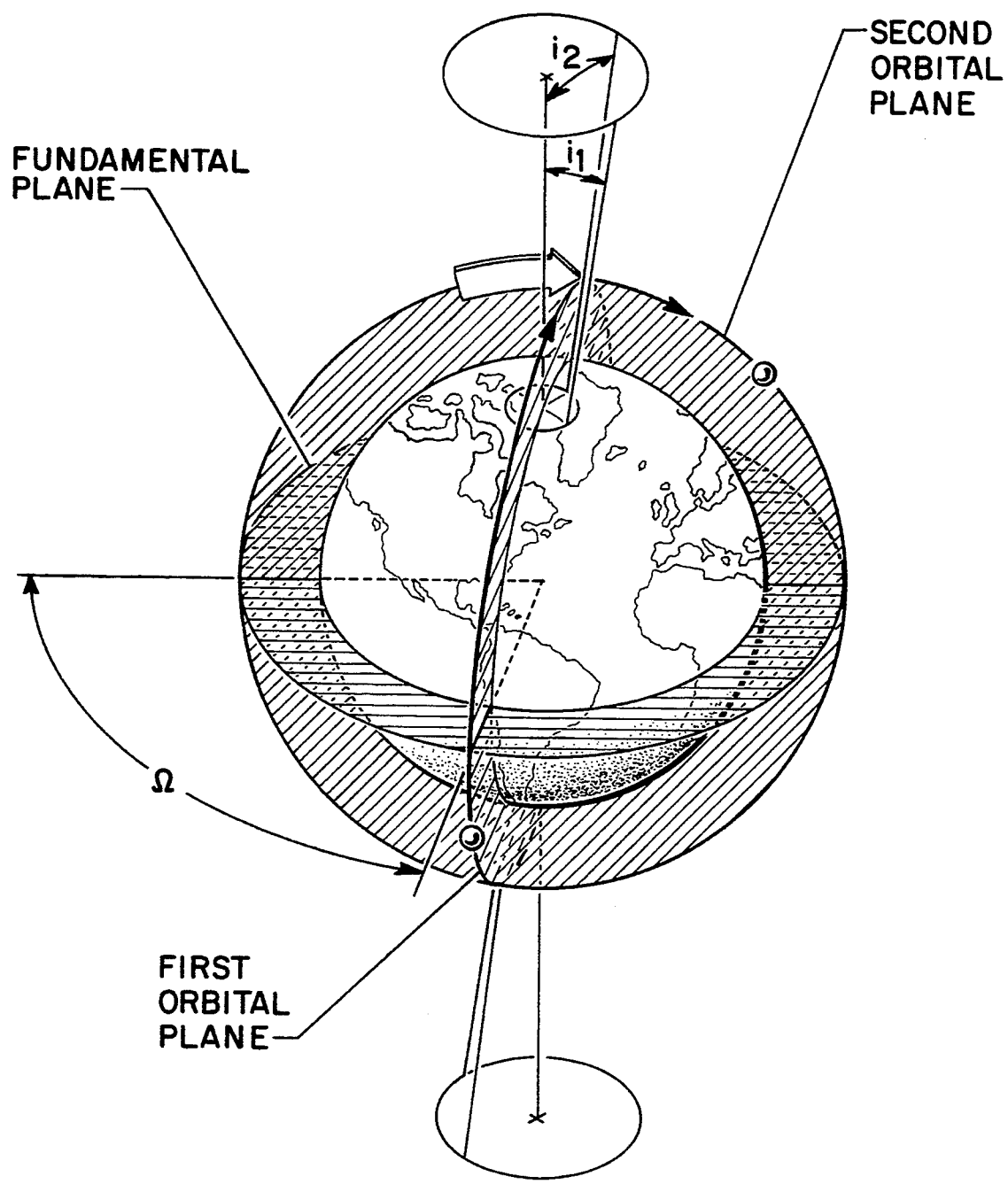

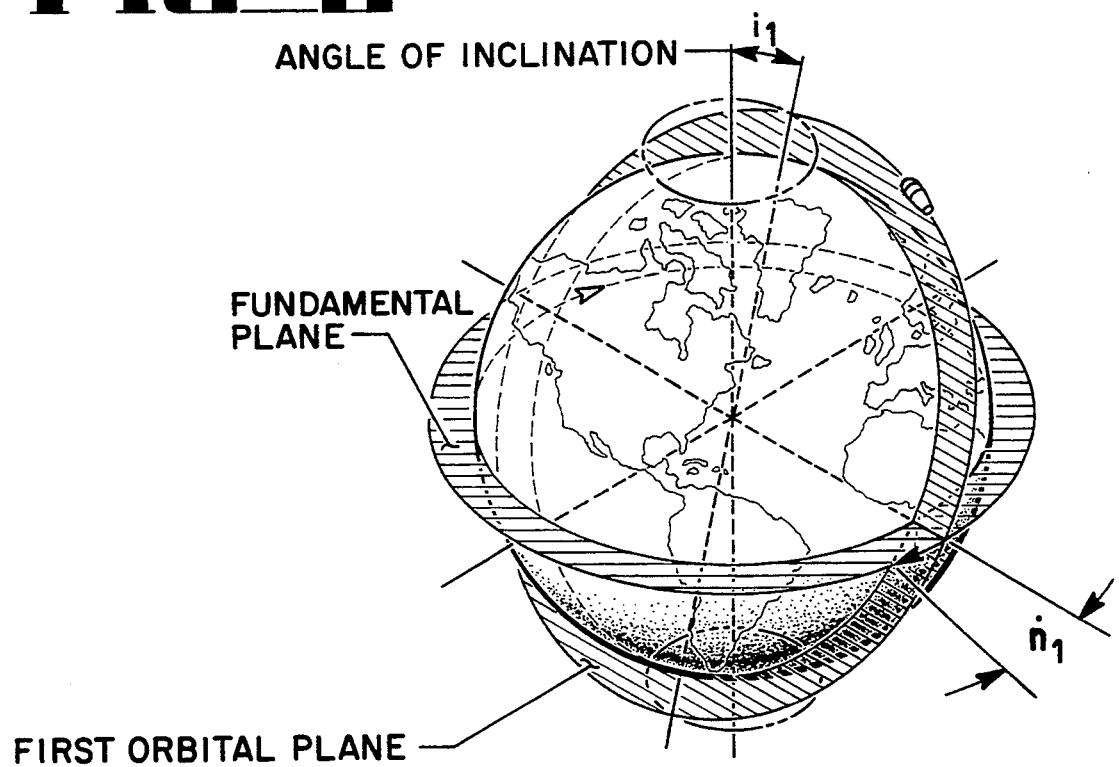
FIG_3
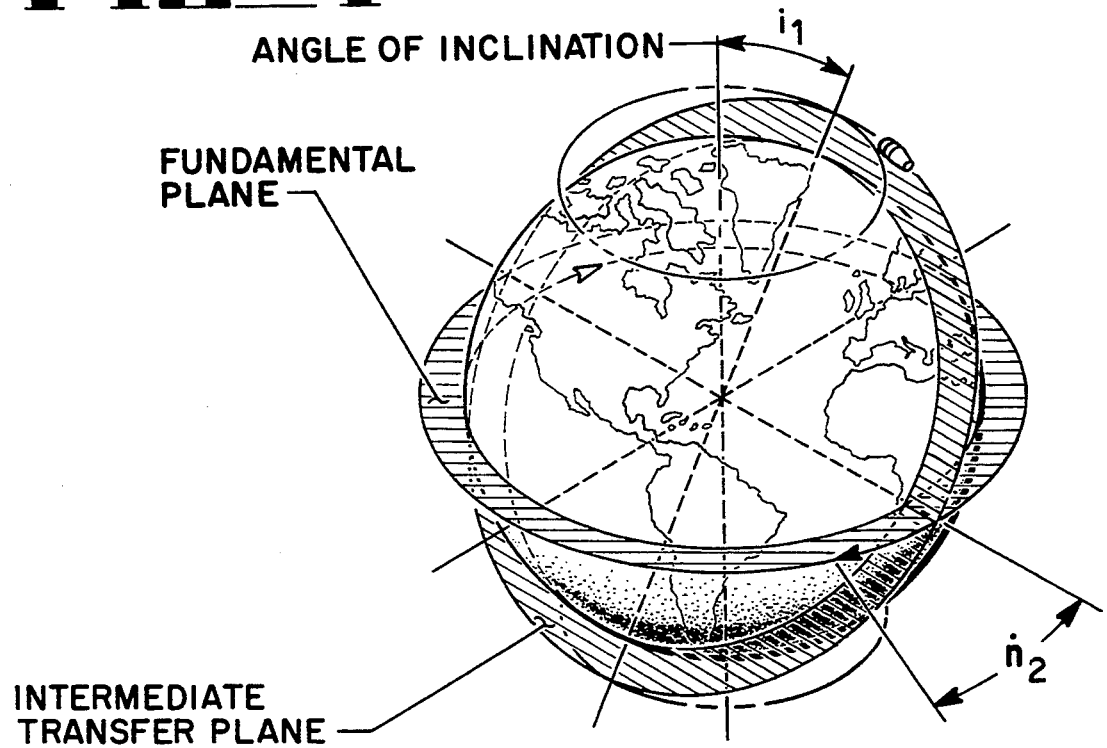
FIG_4

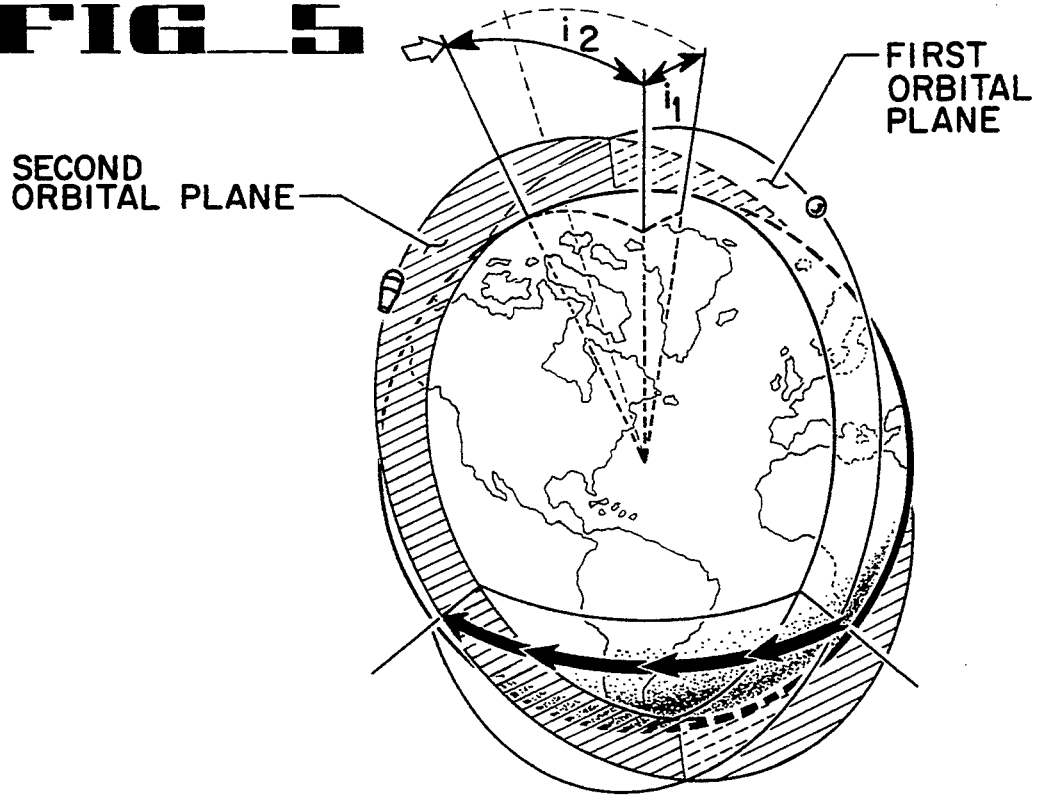
FIG_5
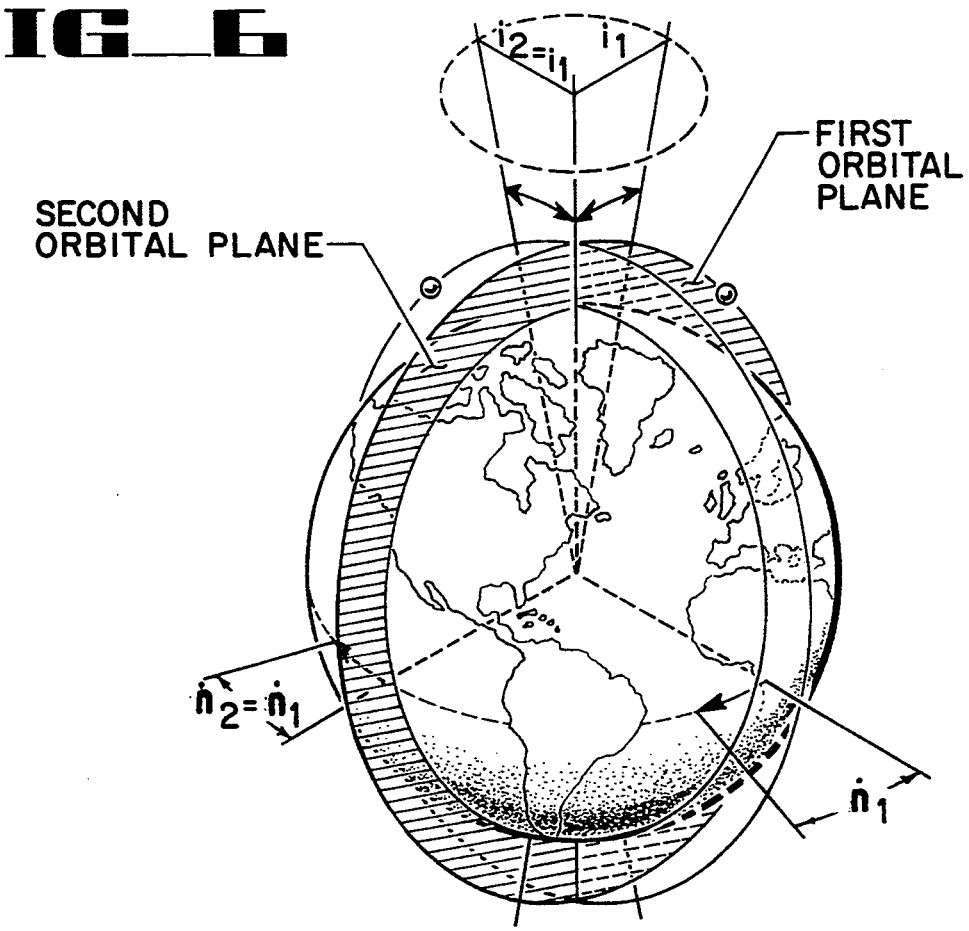
FIG_6

TECHNIQUE FOR DISPENSING EARTH SATELLITES INTO MULTI-PLANAR ORBITS

TECHNICAL FIELD

This invention relates generally to the launching of earth satellites, and more particularly to a technique for dispensing a plurality of earth satellites from a delivery vehicle into different orbital planes using a minimal amount of fuel.

BACKGROUND ART

Assuming that the earth is spherically symmetrical and has a substantially uniform mass distribution, the size, shape and orientation of the orbit of an earth satellite can be completely described by specifying six independent variables, which are conventionally called "orbital elements". The orbital elements of an earth satellite can be specified in terms of a three-dimensional, rectangular, cartesian coordinate system defined by unit vectors I, J and K with a geocentric origin, where the unit vectors I and J lie in a so-called "fundamental plane" that coincides with the equatorial plane of the earth, and where the unit vector K is perpendicular to the fundamental plane and points to the north pole of the earth. In general, the orbit of an earth satellite traces an elliptical path in a plane (called the "orbital plane") that intersects the fundamental plane. Furthermore, an earth satellite generally has an angular momentum (i.e., a spin) represented by a vector h, which is inclined at an angle with respect to the unit vector K.

In FIG. 1, the orbital elements of an earth satellite are illustrated as follows:

(1) the semi-major axis of the elliptical orbit of the satellite, which is a constant defining the size of the orbit;

(2) the eccentricity, e, of the elliptical orbit of the satellite, which is a constant defining the shape of the orbit;

(3) the inclination, i, of the satellite's orbital plane, which is the angle between the unit vector K and the angular momentum vector h;

(4) the longitude of the ascending node, $\Omega$, which is the angle in the fundamental plane between the unit vector 1 and the line in the fundamental plane at which the orbit of the satellite crosses through the fundamental plane (i.e., the "line of nodes", n) as the satellite travels in a northerly direction measured counterclockwise when viewed from the north side of the fundamental plane;

(5) the argument of perigee, $\Omega$, which is the angle in the orbital plane of the satellite between the ascending node and the point of perigee (i.e., the point in the orbit of the satellite that is closest to the earth) measured in the direction of the satellite's motion; and (6) the true anomaly at epoch, $\nu_O$, which is the angle in the orbital plane of the satellite between perigee and the position of the satellite at a particular time.

In reality, the earth is not spherically symmetric, but is bulged at the equator, flattened at the poles and is generally asymmetric in mass distribution. This asymmetricity of the earth produces perturbative accelerations on a satellite that is intended to remain in a designated orbital plane. Such perturbative accelerations cause the satellite's actual orbital plane to change over time from the designated orbital plane.

Various satellite communication networks have been proposed, which would require that a plurality of satellites be transported to different planar orbits. In FIG. 2, a technique that has been previously proposed for dispensing two different sets of satellites into two correspondingly different planar orbits from a single launch vehicle is illustrated. As indicated in FIG. 2, a single launch vehicle (e.g., a rocket) dispenses a first set comprising one or more satellites into a designated first orbit in a first orbital plane; and the launch vehicle is then accelerated (with a concomitant expenditure of fuel) directly to a second orbital plane at which a second set comprising one or more satellites is dispensed into a designated second orbit in the second orbital plane.

The technique for accelerating the launch vehicle directly from the first orbital plane to the second orbital plane, as illustrated in FIG. 2, does not make use of the perturbative accelerations affecting the launch vehicle when the launch vehicle is in orbit in the first orbital plane.

SUMMARY OF THE INVENTION

It is an object of the present invention to provide a technique for dispensing a plurality of earth satellites from a single launch vehicle into orbits in different orbital planes using a minimal amount of fuel.

It is an object of the present invention to provide a technique for dispensing a first set of one or more satellites into a designated first orbit in a first orbital plane, and for dispensing a second set of one or more satellites into a designated second orbit in the second orbital plane, from a single launch vehicle by using perturbative accelerations affecting the launch vehicle in the first orbital plane to minimize the amount of fuel needed to maneuver the launch vehicle from the first orbital plane to the second orbital plane.

In accordance with the present invention, a launch vehicle (e.g., a rocket) carrying a payload consisting of:

1) a first set of one or more satellites for delivery to a designated first orbit in a first orbital plane, and 2) a second set of one or more satellites for delivery to a designated second orbit in a second orbital plane, is launched from earth in a conventional manner to an orbit in the first orbital plane where the satellites of the first set are released into the designated first orbit in the first orbital plane. Then, after the first set of satellites has been released, a first acceleration is imparted to the launch vehicle in order to change the inclination and the longitude of the ascending node of the launch vehicle by an appropriate amount so as to cause a nodal drift of the launch vehicle from the first orbital plane to the second orbital plane over a specified time interval. When the launch vehicle reaches the second orbital plane, a second acceleration is then imparted to the launch vehicle in order to counteract the change in inclination produced by the first acceleration—thereby causing the launch vehicle to be restored to the inclination that it had prior to the application of the first acceleration. The second acceleration stops the nodal drift of the launch vehicle, whereupon the launch vehicle assumes a relatively permanent orbit in the second orbital plane. The satellites of the second set are then released into the designated second orbit in the second orbital plane.

DESCRIPTION OF THE DRAWING

FIG. 1 illustrates the orbital elements defining the size, shape and orientation of the orbit of an earth satellite.

FIG. 2 illustrates a previously proposed technique whereby a launch vehicle, after dispensing a first earth satellite into a first orbit in a first orbital plane, is then moved directly to a second orbit in a second orbital plane in order to dispense a second earth satellite into the second orbit.

FIG. 3 illustrates a launch vehicle that has dispensed a first earth satellite into a first orbit in a predetermined first orbital plane, which has an inclination $i_1$ and a corresponding nodal drift rate $n_1$.

FIG. 4 illustrates the launch vehicle of FIG. 3 after a first acceleration has been applied thereto in accordance with the present invention to cause the orbital plane of the launch vehicle to assume a different inclination $i_2$ and a correspondingly different nodal drift rate $n_2$.

FIG. 5 illustrates the launch vehicle of FIG. 4 after the drifting orbital plane of the launch vehicle has reached a position coinciding with a predetermined second orbital plane, which has a specified angular separation in longitude of the ascending node from the first orbital plane.

FIG. 6 illustrates the launch vehicle of FIG. 5 after a second acceleration has been applied thereto in accordance with the present invention to change the inclination of the orbital plane of the launch vehicle from $i_2$ to $i_1$, whereupon the launch vehicle dispenses a second earth satellite into a second orbit in the second orbital plane, where the first and second orbital planes drift at the same nodal drift rate.

BEST NODE OF CARRYING OUT THE INVENTION

In practicing the present invention, a launch vehicle (e.g., a rocket) carrying a first set of satellites to be dispensed into a first orbit in a predetermined first orbital plane and a second set of satellites to be dispensed into a second orbit in a predetermined second orbital plane is launched in a conventional manner to the first orbit.

In FIG. 3, the launch vehicle is illustrated in the first orbit in the first orbital plane, which has an inclination $i_1$ and a corresponding nodal drift rate $n_1$. While in the first orbit, the launch vehicle dispenses the first set of satellites (which may comprise one or more satellites) in a conventional manner. After the first set of satellites has been dispensed, a first acceleration is imparted in a conventional manner to the launch vehicle to cause the inclination of the instantaneous orbital plane of the launch vehicle to change from the inclination $i_1$ of the first orbital plane of the first set of satellites to a different inclination i. The instantaneous orbital plane of the launch vehicle (called the "intermediate transfer plane") thereby assumes a nodal drift rate $n_2$, which is greater than the nodal drift rate $n_1$ of the first orbital plane of the first set of satellites.

In FIG. 4, the launch vehicle is illustrated in orbit in the intermediate transfer plane, which is drifting at the nodal drift rate $n_2$. After a predetermined amount of time, the intermediate transfer plane drifts into coincidence with the second orbital plane.

In FIG. 5, the launch vehicle is illustrated in orbit in the intermediate transfer plane when coincidence with the second orbital plane has been reached. The second orbital plane has a specified angular separation in longitude of the ascending node from the first orbital plane.

In FIG. 6, the launch vehicle is illustrated after the intermediate transfer plane has reached coincidence with the second orbital plane, whereupon a second acceleration is imparted in a conventional manner to the launch vehicle to cause the inclination of the intermediate transfer plane to change from $i_2$ to i. The nodal drift rate of the intermediate transfer plane thereupon correspondingly changes from $n_2$ to $n_1$. The launch vehicle then dispenses the second set of satellites into the second orbit in the predetermined second orbital plane.

Since the first and second orbital planes have the same inclination, they drift at the same nodal rate. Thus, the satellites of the first and second sets maintain substantially constant positions with respect to each other in the corresponding first and second orbits.

By taking advantage of the differential nodal drift that is produced when the first acceleration is imparted to the launch vehicle in the first orbit to move the launch vehicle to the second orbit over a specified amount of time, and by then imparting a second acceleration to the launch vehicle in the second orbit to counteract the first acceleration—i.e., to cancel the differential nodal drift—the launch vehicle can be moved from the first orbit to the second orbit with a significantly smaller expenditure of fuel than would be required to thrust the launch vehicle directly from the first orbit to the second orbit.

A practitioner skilled in the art of rocketry and satellite deployment, after perusing the foregoing specification and accompanying drawing, would be able to practice the present invention in any application requiring delivery of a specified number of satellites to specified orbits in different orbital planes using a single launch vehicle. Thus, the foregoing specification and accompanying drawing are to be considered as merely illustrative of the invention, which is defined more generally by the following claims and their equivalents.

I claim:

1. A method of dispensing a first satellite into a designated first orbit in a first orbital plane, and a second satellite into a designated second orbit in a second orbital plane, said first and second satellites being dispensed from a launch vehicle on a single launch, said method comprising the sequential steps of:

a) placing said launch vehicle with said first and second satellites carried thereon in said first orbital plane;

b) releasing said first satellite into said designated first orbit in said first orbital plane;

c) imparting a first acceleration to said launch vehicle so as to change a combination of inclination and ascending nodal longitude of said launch vehicle so that said launch vehicle undergoes a nodal drift from said first orbital plane to said second orbital plane over a specified time interval;

d) imparting a second acceleration to said launch vehicle when said launch vehicle reaches said second orbital plane so as to counteract the change in inclination of said launch vehicle produced by said first acceleration, and such that said second acceleration causes said launch vehicle to remain in said second orbital plane; and e) releasing said second satellite into said designated second orbit in said second orbital plane.

2. The method of claim 1 wherein a plurality of satellites is released from said launch vehicle into the corresponding designated orbit in one of said first and second orbital planes.

3. The method of claim 2 wherein a plurality of satellites is released from said launch vehicle into the corresponding designated orbits in both of said first and second orbital planes.

4. A method for dispensing first and second satellites from a launch vehicle comprising:
 a) placing the launch vehicle having said first and second satellites carried thereon in a first orbital plane having a first nodal drift rate;
 b) releasing said first satellite into a first orbit in said first orbital plane;
 c) imparting a first acceleration to said launch vehicle such that said launch vehicle has a second nodal drift rate;
 d) allowing said launch vehicle to move from said first orbital plane to a second orbital plane as a result of said second nodal drift rate;
 e) imparting a second acceleration to said launch vehicle when said launch vehicle reaches said second orbital plane such that said launch vehicle has said first nodal drift rate; and
 f) releasing said second satellite into a second orbit in said second orbital plane.

5. The method of claim 4, wherein said second nodal drift rate is greater than said first nodal drift rate.

6. The method of claim 4, wherein the step of imparting a first acceleration includes changing an inclination of an instantaneous orbital plane of said launch vehicle such that the instantaneous orbital plane of said launch vehicle has said second nodal drift rate.

7. A method for dispensing first and second satellites from a launch vehicle such that said first and second satellites are dispensed into respective first and second orbits of respective first and second orbital planes comprising:
 a) placing the launch vehicle in an orbit in the first orbital plane;
 b) dispensing said first satellite into said first orbit of said first orbital plane while said launch vehicle is orbiting in said first orbital plane;
 c) imparting a first acceleration to said launch vehicle to change an inclination and nodal drift rate of an instantaneous orbital plane of said launch vehicle such that said launch vehicle undergoes a nodal drift relative to said first orbital plane;
 d) waiting a predetermined period of time after imparting said first acceleration, and after said predetermined period of time imparting a second acceleration to said launch vehicle to stop said nodal drift relative to said first orbital plane and to place said launch vehicle in an orbit in said second orbital plane; and
 e) dispensing said second satellite into said second orbit of said second orbital plane while said launch vehicle is orbiting in said second orbital plane.

8. A method for dispensing first and second satellites from a launch vehicle such that said first and second satellites are dispensed into respective first and second orbits of respective first and second orbital planes comprising:
 a) placing the launch vehicle in an orbit in the first orbital plane;
 b) dispensing said first satellite into said first orbit of said first orbital plane while said launch vehicle is orbiting in said first orbital plane;
 c) imparting a first acceleration to said launch vehicle to change an inclination and nodal drift rate of an instantaneous orbital plane of said launch vehicle such that said instantaneous orbital plane of said launch vehicle undergoes a nodal drift relative to said first orbital plane;
 d) waiting a predetermined period of time after imparting said first acceleration, and after said predetermined period of time imparting a second acceleration to said launch vehicle such that said launch vehicle is orbiting in said second orbital plane; and
 e) dispensing said second satellite into said second orbit of said second orbital plane while said launch vehicle is orbiting in said second orbital plane.

* * * * *

UNITED STATES PATENT AND TRADEMARK OFFICE
CERTIFICATE OF CORRECTION

PATENT NO.   : 5,393,017
DATED        : February 28, 1995
INVENTOR(S)  : Stanford S. SMITH, et al.

It is certified that error appears in the above-indentified patent and that said Letters Patent is hereby corrected as shown below:

On the title page, Item [75], the third inventor's name should read:

--Emanuel V. Dimiceli--

Signed and Sealed this

Sixth Day of June, 1995

*Attest:*

BRUCE LEHMAN

*Attesting Officer*     *Commissioner of Patents and Trademarks*